United States Patent [19]

Winter

[11] 4,042,252
[45] Aug. 16, 1977

[54] INFLATABLE SPHERICAL VEHICULAR DEVICE

[76] Inventor: Richard D. Winter, 10237 Park Ave., Bellflower, Calif. 90706

[21] Appl. No.: 604,435

[22] Filed: Aug. 13, 1975

[51] Int. Cl.² ............................................. B60F 3/00
[52] U.S. Cl. .................................. 280/206; 9/310 F; 115/1 A; 272/1 B
[58] Field of Search ................ 280/206, 78; 115/1 A, 115/1 R, 20; 9/310 F, 310 G, 310 R; 272/1 R, 1 B

[56] References Cited

U.S. PATENT DOCUMENTS

| 2,938,727 | 5/1930 | Nosak | 280/206 X |
|---|---|---|---|
| 3,000,022 | 9/1961 | Cathey et al. | 280/206 X |
| 3,083,979 | 4/1963 | Boyd | 280/206 |
| 3,252,711 | 5/1966 | Young | 280/78 |
| 3,428,015 | 2/1969 | Cloud | 280/206 |
| 3,769,929 | 11/1973 | Scheber | 280/206 |
| 3,779,201 | 12/1973 | Spahn | 280/206 |
| 3,806,156 | 4/1974 | Tidwell | 280/206 |

FOREIGN PATENT DOCUMENTS

| 1,292,441 | 10/1972 | United Kingdom | 280/206 |
| 1,233,752 | 5/1971 | United Kingdom | 280/206 |

Primary Examiner—Philip Goodman
Assistant Examiner—J. D. Rubenstein
Attorney, Agent, or Firm—Dominick Nardelli

[57] ABSTRACT

An inflatable spherical device is disclosed made of two hemispherical shells or sections that are fastened together by a quick disengageable means, such as a zipper. Each hemispherical shell is made of an outer flexible skin and an inner flexible skin, concentrically spaced apart and having an annular circular flat member bonded by its outer periphery to the periphery of the outer skin and by its inner periphery to the periphery of the inner skin, forming a hemispherical air-tight compartment. Means are provided to inflate each shell. To maintain the outer and inner skins evenly spaced apart and to provide ventilation through the shells, a plurality of flexible wall tubes are disposed between the outer and inner skins. The respective ends of the tubes are bonded to suitable apertures in each of the outer and inner skins.

2 Claims, 6 Drawing Figures

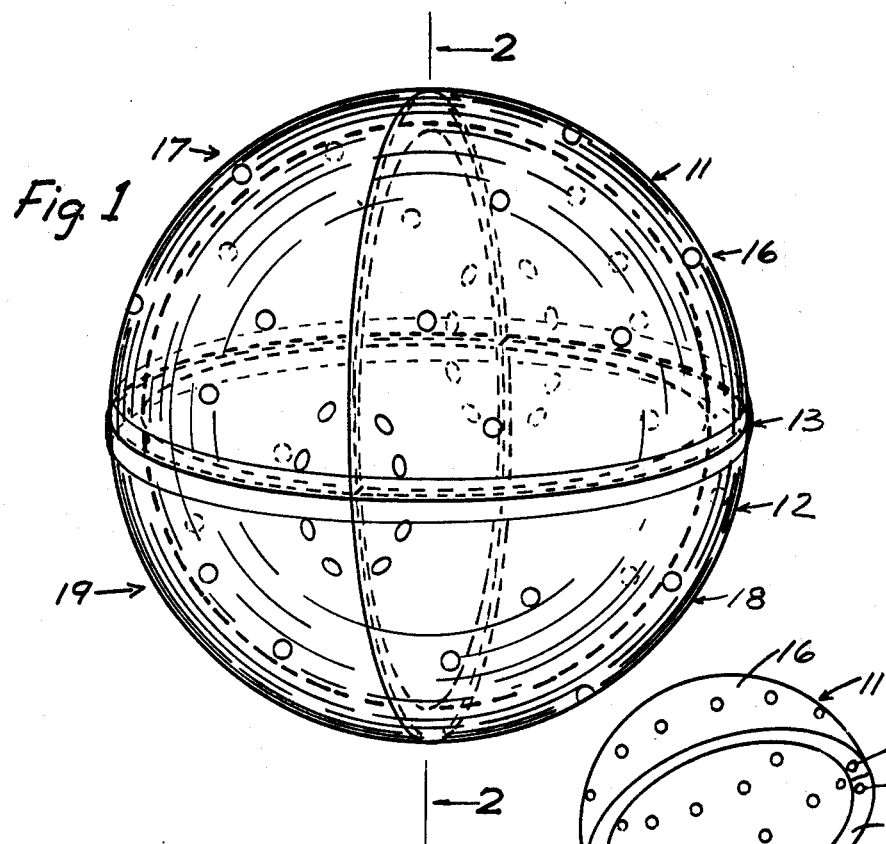

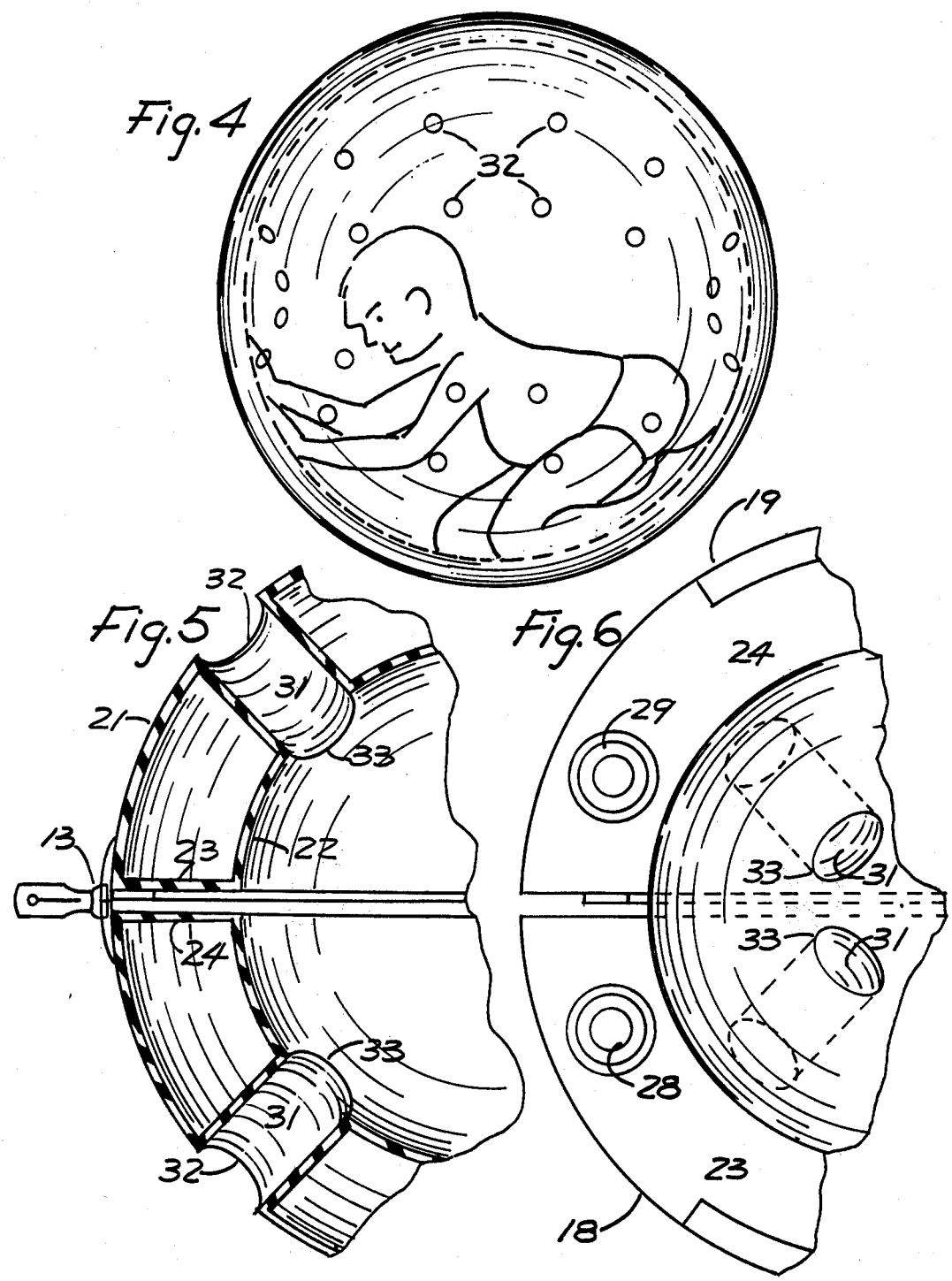

INFLATABLE SPHERICAL VEHICULAR DEVICE

FIELD OF THE INVENTION

This invention relates to spherically shaped devices adapted as a carriage of human beings, and more particularly to such devices that are collapsible for storage and are inflatable to shape for use.

BACKGOUND OF THE INVENTION

Spherical vehicular devices for transporting children are well known in the art. Several United States patents teach such devices, such as U.S. Pat. Nos. 3,013,808; 3,083,979; and 3,252,711. However, the devices taught by these prior art patents are rigid and cannot be readily broken down for storage in the smallest possible space. U.S. Pat. No. 3,428,015 does teach how to make an inflatable spherical device, but these teachings make it difficult or costly to place ventilation holes therethrough. Besides, each of the great tubes would require integral interconnecting passages in order to eliminate each one separately.

OBJECTS OF THE INVENTION

An object of this invention is to provide a simple economical inflatable spherical device wherein a human can be transported by his own power.

Another object of this invention is to provide an inflatable, spherical device wherein outer and inner skins are interconnected with a plurality of flexible wall tubes.

These and other objects and features of advantage will become more apparent after studying the following description of the preferred embodiment of my invention, together with the appended drawing.

BRIEF DESCRIPTION OF THE DRAWING

FIG. 1 is a pictorial view of the novel inflatable device in assembled form.

FIG. 2 is a great-circle sectional view, taken on line 2—2 of FIG. 1, which is normal to a plane of separation of both hemispherical sections.

FIG. 3 is another pictorial view, showing the two hemispherical sections separated.

FIG. 4 is another pictorial view, similar to FIG. 1, showing a child enclosed therein.

FIG. 5 is an enlarged section of a portion, substantially in the region enclosed by circle 5—5 of FIG. 2, to show the interconnection tubes.

FIG. 6 is an enlarged plan view of a portion of one hemispherical section, taken on line 6—6 of FIG. 3.

DETAILED DESCRIPTION OF THE DRAWING

As shown in FIG. 1, the novel device is spherical in shape and is comprised of two hemispherical sections 11 and 12, that are releaseably fastened together by a suitable means 13, more clearly shown in FIG. 3. As shown in FIG. 3, the means 13 is, for example, a standard zipper. Each hemispherical section is preferably made of two spherical quadrants, for example, hemispherical section 11 is made of two spherical quadrants 16 and 17, and hemispherical section 12 is made of two spherical quadrants 18 and 19. The four spherical quadrants are constructed substantially similar. Each quadrant has an outer skin 21 and an inner skin 22, each of which is spherical in shape, but consists of only a quarter of a sphere. The outer and inner skins 21 and 22 are bonded at their respective periphery by semi-annular flat members 23 and 24 so that a hollow circle quadrant is formed. Two of the quadrants 16 and 17 are permanently bonded together by suitable means to make them hemispherical section 11 and the other two quadrants, 18 and 19, similarly form hemispherical section 12. Means for bonding the respective two quadrants together can be any standard form.

In order that the device could be collapsible, the outer and inner skins 21 and 22 are made of a flexible air-tight material, such as standard available vinyl, and are suitably bonded together. Standard air valves 26, 27, 28 and 29 are placed in the respective quadrants 16, 17, 18, and 19 so that the quadrants can be inflated, one by one. One finds that means are required to keep the inner and outer skins 21 and 22 evenly spaced apart. I have found that if these means are in a form of flexible tubes 31, also made of vinyl, the inner and outer skins can be held substantially evenly apart and ventilation is provided. As more clearly shown in FIG. 5, each tube 31 is bonded at its respective end to the periphery of suitable apertures 32 and 33 made in outer and inner skins 21 and 22, respectively. The number of and diameter size of the respective tubes 31 and apertures 32 and 33 depend primarily on the size of the device.

The device is used as follows: With the hemisphere sections apart, as shown in FIG. 3, a child can crawl therein and pull the zipper therearound to form the sphere. One skilled in the art could devise a means to manipulate the zipper from within. The child is now free to roll round and receives ventilation through the tubes 31. Since the device is inflated, any objects struck by the device would not be subject to shock as with prior art devices. When the device is not in use, or is to be stored for transportation, the air is deflated through valves 26, 27, 28 and 29. Whenever one wants to use the device again, air is simply pumped into each quadrant through valves 26, 27, 28 and 29.

Having described the preferred embodiment of my invention, one skilled in the art can devise other embodiments without departing from the spirit and scope of my invention. Therefore, my invention is not to be considered as limited to the disclosed embodiment, but includes all embodiments falling within the scope of the appended claims.

I claim:

1. A spherical device comprising:
   a pair of hemispherical sections and each of said sections comprising:
   an outer flexible skin;
   an inner flexible skin;
   a flat annular member bonded to the periphery of both said outer skin and said inner skin;
   said outer skin having a plurality of apertures;
   said inner skin having a plurality of apertures, each of which is radially aligned with respective ones of said apertures in said outer skin;
   a plurality of flexible tubes, each of which is respectively bonded to one aperture of said outer skin and to the radially aligned aperture of said inner skin;
   a zipper means releasably fastening said hemispherical sections together so that a person may have access to the interior.

2. The device of claim 1 wherein:
   each hemispherical section is made of two airtight quadrants.

* * * * *